United States Patent
Kanamori (10) Patent No.: US 11,473,750 B2
(45) Date of Patent: Oct. 18, 2022

(54) OPTICAL UNIT WITH LIGHT SOURCE FOR LIGHT DISTRIBUTION AND ELECTROMAGNETIC WAVE GENERATOR FOR DETECTING SURROUNDING OBJECTS AND VEHICULAR LAMP HAVING THE SAME

(71) Applicant: KOITO MANUFACTURING CO., LTD., Tokyo (JP)

(72) Inventor: Akitaka Kanamori, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 55 days.

(21) Appl. No.: 17/059,546

(22) PCT Filed: Jun. 12, 2019

(86) PCT No.: PCT/JP2019/023303
§ 371 (c)(1),
(2) Date: Nov. 30, 2020

(87) PCT Pub. No.: WO2019/240177
PCT Pub. Date: Dec. 19, 2019

(65) Prior Publication Data
US 2021/0231285 A1    Jul. 29, 2021

(30) Foreign Application Priority Data
Jun. 15, 2018  (JP) ............................. JP2018-114548

(51) Int. Cl.
*F21S 41/675*    (2018.01)
*G01S 17/04*    (2020.01)
(Continued)

(52) U.S. Cl.
CPC .............. *F21S 41/675* (2018.01); *B60Q 1/08* (2013.01); *F21S 41/365* (2018.01); *G01J 1/04* (2013.01); *G01S 17/04* (2020.01)

(58) Field of Classification Search
CPC .......... F21S 41/13; F21S 41/14; F21S 41/147; F21S 41/16; F21S 41/365; F21S 41/675; B60Q 1/08; G01S 17/04
See application file for complete search history.

(56) References Cited

U.S. PATENT DOCUMENTS

2011/0249460 A1* 10/2011 Kushimoto ........... F21S 41/141
  362/509
2012/0236584 A1* 9/2012 Ueno ...................... H01L 33/38
  257/91
(Continued)

FOREIGN PATENT DOCUMENTS

CN   102791509 A   11/2012
CN   210118706 U   2/2020
(Continued)

OTHER PUBLICATIONS

Machine translation of JP 2011 157022A, retrieved from espacenet.worldwide.com on Aug. 4, 2022 (Year: 2022).*
(Continued)

*Primary Examiner* — Rajarshi Chakraborty
*Assistant Examiner* — Steven Y Horikoshi
(74) *Attorney, Agent, or Firm* — Sughrue Mion, PLLC (57) ABSTRACT

The optical unit includes a light source, an electromagnetic wave generator, a first reflector configured to reflect emitted light emitted from the light source and electromagnetic waves emitted by the electromagnetic wave generator in a first reflection region whose reflection direction is changed periodically, and a second reflector configured to reflect first reflected light reflected by the first reflector and first electromagnetic waves again in a second reflection region whose
(Continued)

reflection direction is changed periodically. The first reflector is configured to scan the second reflection region with the first reflected light and the first electromagnetic waves. The second reflector is configured to form a light distribution pattern by performing scanning with second reflected light, and to detect a surrounding object by performing scanning with second electromagnetic waves.

12 Claims, 11 Drawing Sheets

(51) Int. Cl.
  *F21S 41/365* (2018.01)
  *B60Q 1/08* (2006.01)
  *G01J 1/04* (2006.01)

(56) References Cited

U.S. PATENT DOCUMENTS

| | | | | |
|---|---|---|---|---|
| 2013/0038736 | A1* | 2/2013 | Yamamura | F21S 41/155 348/148 |
| 2013/0044138 | A1 | 2/2013 | Koga | |
| 2013/0258689 | A1* | 10/2013 | Takahira | F21S 41/151 362/465 |
| 2014/0029282 | A1 | 1/2014 | Ravier et al. | |
| 2014/0042325 | A1 | 2/2014 | Yamamura | |
| 2015/0307018 | A1* | 10/2015 | Shibata | B60Q 1/143 362/466 |
| 2016/0144770 | A1* | 5/2016 | Graf | B60Q 1/0023 362/546 |
| 2017/0159903 | A1 | 6/2017 | Yamamura | |
| 2017/0159904 | A1 | 6/2017 | Yamamura | |
| 2017/0185855 | A1 | 6/2017 | Yamamura | |
| 2017/0282783 | A1 | 10/2017 | Ravier et al. | |
| 2018/0009366 | A1 | 1/2018 | King | |
| 2018/0297511 | A1* | 10/2018 | Park | B60Q 1/1423 |
| 2020/0263850 | A1* | 8/2020 | Kawaguchi | F21V 9/30 |

FOREIGN PATENT DOCUMENTS

| | | | | |
|---|---|---|---|---|
| EP | 3 048 362 | A1 | 7/2016 | |
| JP | 2009-224039 | A | 1/2009 | |
| JP | 2011157022 | A * | 8/2011 | B60Q 1/085 |
| JP | 2014-29858 | A | 2/2014 | |
| JP | 2015-026628 | A | 2/2015 | |
| WO | 2011129105 | A1 | 10/2011 | |
| WO | 2012144144 | A1 | 10/2012 | |
| WO | 2016/042052 | A1 | 3/2016 | |
| WO | 2017104167 | A1 | 6/2017 | |

OTHER PUBLICATIONS

Office Action dated Mar. 1, 2021 by the State Intellectual Property Office of P.R. China in counterpart Chinese Patent Application No. 201910519303.7.

Written Opinion (PCT/ISA/237) issued by the International Searching Authority in corresponding International Application No. PCT/JP2019/023303, dated Aug. 20, 2019.

International Search Report (PCT/ISA/210), issued by International Searching Authority in corresponding International Application No. PCT/JP2019/023303, dated Aug. 20, 2019.

* cited by examiner

OPTICAL UNIT WITH LIGHT SOURCE FOR LIGHT DISTRIBUTION AND ELECTROMAGNETIC WAVE GENERATOR FOR DETECTING SURROUNDING OBJECTS AND VEHICULAR LAMP HAVING THE SAME

TECHNICAL FIELD

The present disclosure relates to an optical unit and a vehicular headlamp.

BACKGROUND ART

In recent years, a device has been devised that reflects light emitted from a light source to a front of a vehicle and scans a region in front of the vehicle with the reflected light to form a predetermined light distribution pattern. For example, a device has been devised (see Patent Literature 1). The device includes a rotary reflector that rotates in one direction about a rotation axis while reflecting light emitted from a light source, and a light source including a light emitting element. A reflective surface is provided such that the light of the light source forms a desired light distribution pattern. The light is reflected by the rotary reflector while the rotary reflector is rotating. The above-described device can scan surroundings and detect an obstacle by reflecting invisible light such as millimeter waves emitted from a radar separately from the light source using the rotary reflector.

CITATION LIST

Patent Literature

Patent Literature 1: JP-A-2015-26628

SUMMARY OF INVENTION

Technical Problem

However, in the above-described device, a light distribution pattern is formed by scanning a light source image of one light emitting element in a horizontal direction, or by scanning, in the horizontal direction, a light source image extending in the horizontal direction of a plurality of light emitting elements arranged in a row. Therefore, even if the light emitting element is turned on and off at a predetermined timing, a variation in a position and a size of a non-irradiated region formed in a part of the light distribution pattern is greatly restricted. In the above-described device, if a range in which an obstacle is to be detected is to be expanded, the radar becomes large. Therefore, a space for arranging the radar is greatly restricted.

The present disclosure has been made in view of these circumstances. An object of the present disclosure is to provide a new optical unit capable of forming a light distribution pattern and detecting a surrounding object, and a vehicular headlamp including the optical unit.

Solution to Problem

In order to solve the above-described problems, an optical unit according to an aspect of the present disclosure includes: a light source configured to emit visible light to illuminate surroundings; an electromagnetic wave generator configured to emit electromagnetic waves to detect a surrounding object; a first reflector configured to reflect emitted light from the light source and electromagnetic waves emitted by the electromagnetic wave generator in a first reflection region whose reflection direction is changed periodically; and a second reflector configured to reflect first reflected light and first electromagnetic waves that are reflected by the first reflector again in a second reflection region whose reflection direction is changed periodically. The first reflector is configured to scan the second reflection region with the first reflected light and the first electromagnetic waves. The second reflector is configured to form a light distribution pattern by performing scanning with second reflected light obtained by reflecting the first reflected light, and to detect a surrounding object by performing scanning with second electromagnetic waves obtained by reflecting the first electromagnetic waves.

According to this aspect, the emitted light of the light source is reflected in the first reflection region whose reflection direction is changed periodically, and the second reflection region is scanned in at least a line with the first reflected light that has been reflected. Then, the line-shaped pattern is further reflected in the second reflection region whose reflection direction is changed periodically, and the two-dimensional range is scanned with the second reflected light that has been reflected, so that a light distribution pattern is formed. Therefore, even the light source includes only one light emitting element, it is possible to form a non-irradiation region at a predetermined position of the light distribution pattern by controlling, turning on and off of the light emitting element, so that more light distribution patterns can be formed. The optical unit according to this aspect can irradiate a wider range than a range that the light source can directly irradiate without using a reflector. According to this aspect, the electromagnetic waves generated by the electromagnetic wave generator is reflected in the first reflection region whose reflection direction is changed periodically, and the second reflection region is scanned in at least a line with the first electromagnetic waves that have been reflected. Then, the line-shaped pattern is further reflected in the second reflection region whose reflection direction is changed periodically, and a two-dimensional range is scanned with the second electromagnetic waves that have been reflected. Accordingly, the optical unit according to this aspect can detect (irradiate) an object in a wider range without using a reflector or using only one reflector as compared to a range in which the electromagnetic wave generator can detect (irradiate) an object with electromagnetic waves. In other words, a size of the electromagnetic wave generator can be reduced.

The second reflector may reflect the first reflected light in the second reflection region while rotating in one direction about a rotation axis.

The second reflector may be provided with one or more blades that function as the second reflection region around a rotation axis.

Rotation frequency of the first reflector and rotation frequency of the second reflector may be both 50 Hz or more. Accordingly, flickering of the light distribution pattern formed by the visible light is prevented.

Another aspect of the present disclosure also provides an optical unit. The optical unit includes: a light source in which a plurality of light emitting elements are arranged in an array or a matrix, and which is configured to emit visible light to illuminate surroundings; an electromagnetic wave generator configured to emit electromagnetic waves to detect a surrounding object; a first reflector configured to reflect electromagnetic waves emitted by the electromagnetic wave generator in a first reflection region whose reflection direction is changed periodically; and a second reflector configured to reflect emitted light emitted from the light source and first electromagnetic waves reflected by the first reflector in a second reflection region whose reflection direction is changed periodically. The first reflector is configured to scan the second reflection region with the first electromagnetic waves. The second reflector is configured to form a light distribution pattern by performing scanning with reflected light obtained by reflecting the emitted light, and to detect a surrounding object by performing scanning with second electromagnetic waves obtained by reflecting the first electromagnetic waves.

According to this aspect, the array-shaped or matrix-shaped emitted light emitted from the light source is reflected in the second reflection region whose reflection direction is changed periodically, the two-dimensional range is scanned with the reflected light, and the light distribution pattern is formed. According to this aspect, the electromagnetic waves generated by the electromagnetic wave generator is reflected in the first reflection region whose reflection direction is changed periodically, and the second reflection region is scanned in at least a line with the first electromagnetic waves that have been reflected. Then, the line-shaped pattern is further reflected in the second reflection region whose reflection direction is changed periodically, and a two-dimensional range is scanned with the second electromagnetic waves that have been reflected. Accordingly, when no reflector is used or when only one reflector is used, the optical unit according to this aspect can detect an object in a wider range as compared to a range in which the electromagnetic wave generator can detect an object. In other words, a size of the electromagnetic wave generator can be reduced. Since the first reflector may be configured to scan the second reflection region with the first electromagnetic waves without considering the reflection of the visible light emitted from the light source, a degree of freedom in designing a shape and a size is increased.

The first reflector is a micro electro mechanical system.

Rotation frequency of the second reflector may be 50 Hz or more. Accordingly, flickering of the light distribution pattern formed by the visible light is prevented.

The first reflector may reflect the emitted light in the first reflection region while rotating in one direction about a rotation axis.

Rotation frequency of the first reflector is different from rotation frequency of the second reflector. Accordingly, a situation is prevented in Which only a part of the desired light distribution pattern is repeatedly scanned with the second reflected light.

Rotation frequency of the first reflector may be larger than rotation frequency of the second reflector. Accordingly, during one rotation of the second reflector, the second reflection region can be scanned at least once by the visible light or the electromagnetic waves reflected by the first reflector. Therefore, sizes of a light emitting unit of the light source and a generation unit of the electromagnetic wave generator can be reduced.

Another aspect of the present disclosure provides a vehicular headlamp. The vehicular headlamp includes an optical unit and a control unit configured to control an amplitude of a reflection element of the micro electro mechanical system based on a traveling state of a vehicle.

According to this aspect, it is possible to focus the visible light emitted by the light source or the electromagnetic waves emitted by the electromagnetic wave generator by, for example, reducing an amplitude of a reflection element b the control unit when a vehicle is traveling at high speed and requires visible light irradiation or object detection at a greater distance.

Still another aspect of the present disclosure also provides a vehicular headlamp. The vehicular headlamp includes an optical unit and a control unit configured to control magnitude of a drive current of the light source according to the light distribution pattern. The electromagnetic wave generator may be provided with respect to the first reflector so as to irradiate a range including a region below a light distribution pattern formed in front of a vehicle with electromagnetic waves based on emitted light emitted from the light source.

In a traveling vehicle, it is particularly important to detect an object on a road or a sidewalk. Therefore, it is preferable that a legion below visible light for illuminating the surroundings can be irradiated with electromagnetic waves for detecting a surrounding object. Therefore, according to this aspect, the electromagnetic wave generator is provided with respect to the first reflector so as to irradiate a range including a region below a light distribution pattern.

Any combinations of the above-described constituting elements, and implementations of the present disclosure in form of methods, devices, systems, and the like are also effective as aspects of the present disclosure.

Advantageous Effects of Invention

According to the present disclosure, a new optical unit capable of forming a light distribution pattern and detecting a surrounding object can be implemented.

DESCRIPTION OF EMBODIMENTS

Hereinafter, the present disclosure will be described with reference to the drawings based on the embodiments. The same or equivalent components, members, and processing shown in the drawings are denoted by the same reference numerals, and a repetitive description thereof will be omitted. The embodiments are not intended to limit the contents of the present disclosure, and all the features and combinations thereof described in the embodiments are not necessarily essential to the present disclosure.

First Embodiment

An optical unit according to the present embodiment can be used for various vehicle lamps. For example, the optical unit is mounted on a vehicular headlamp, so that it is possible to form a high beam light distribution pattern suitable for various situations in front of a vehicle.

Figure 1:
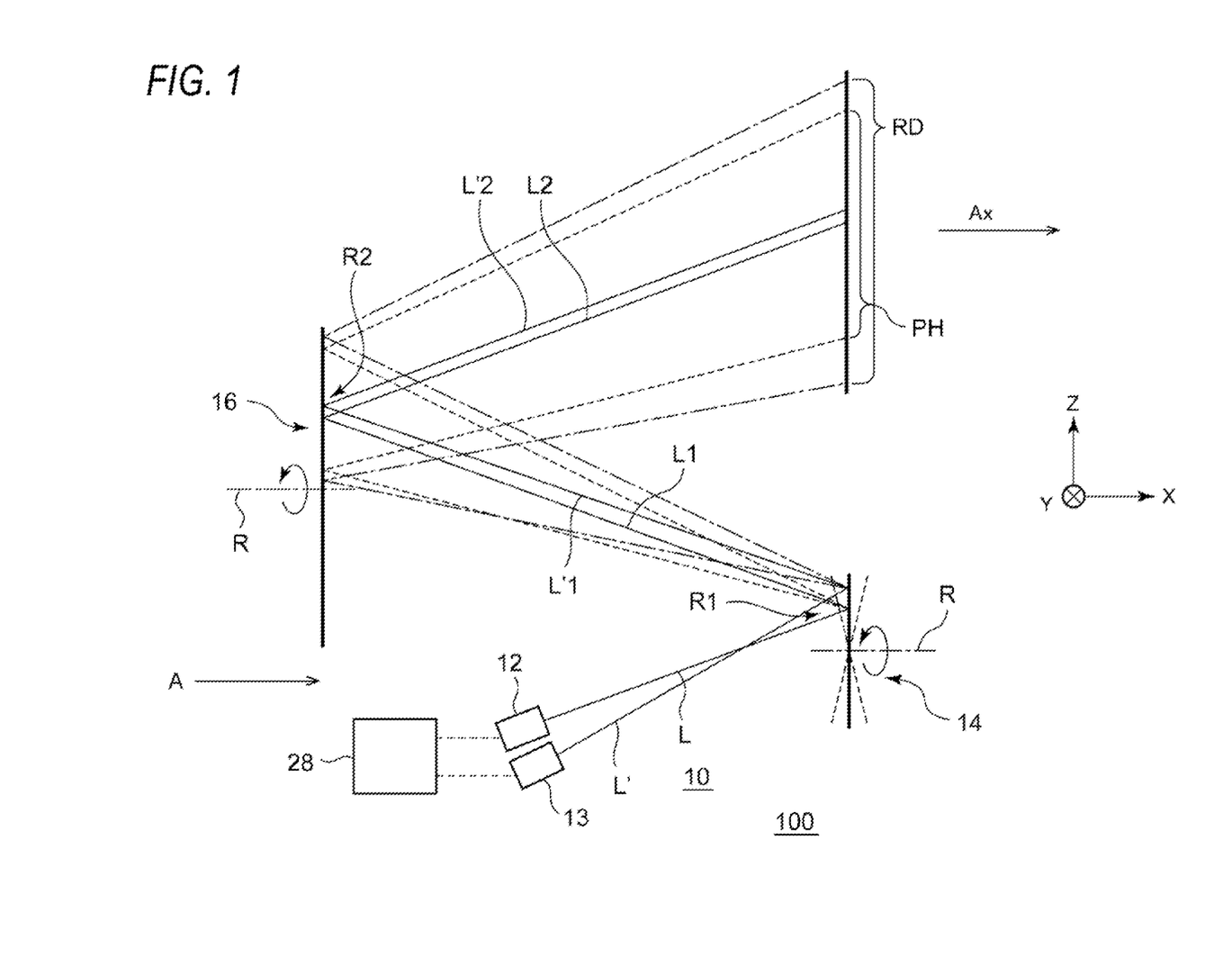
FIG. 1 is a top view showing a schematic configuration of an optical unit according to an embodiment.
Figure 2:
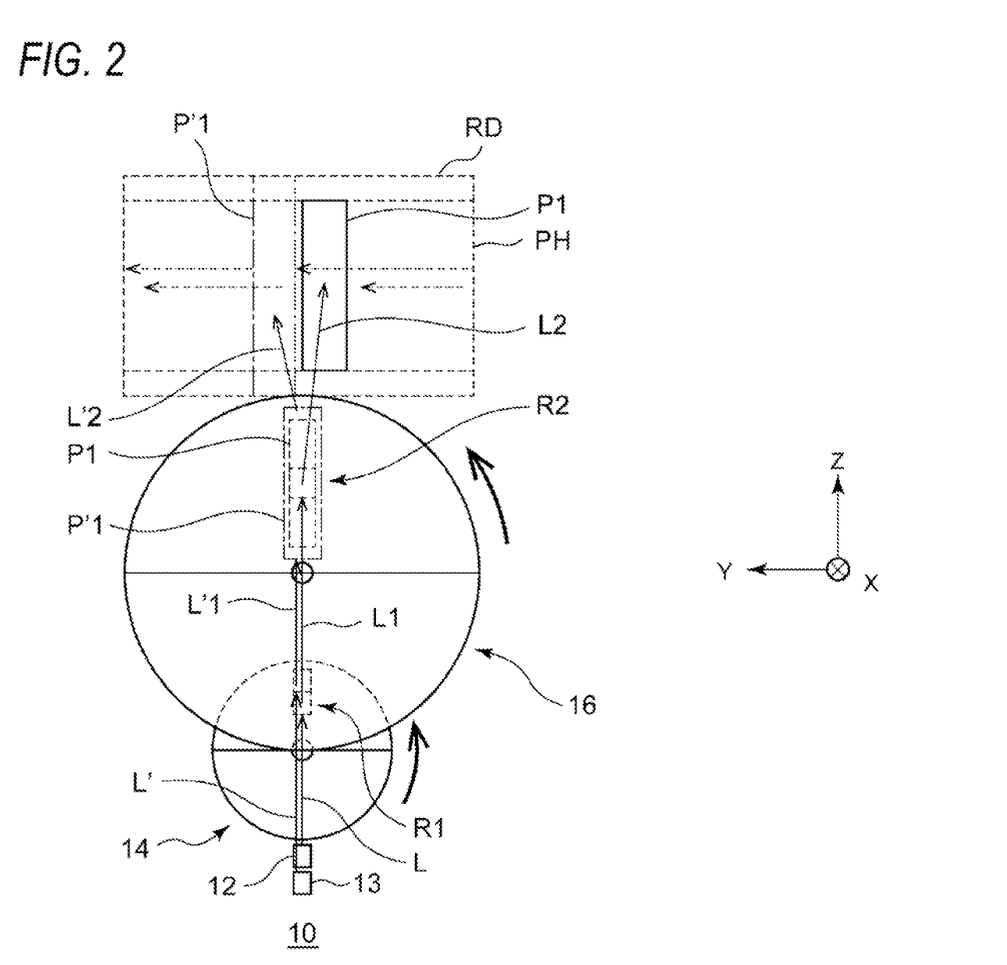
FIG. 2 is a side view showing a schematic configuration of the optical unit shown in FIG. 1 as viewed from an A direction.

FIG. 1 is a top view showing a schematic configuration of the optical unit according to the present embodiment. In FIG. 1, an X direction indicates a front-rear direction of the vehicle, a Y direction indicates a vehicle width direction of the vehicle, and a Z direction indicates a height direction of the vehicle. FIG. 2 is a side view showing a schematic configuration of the optical unit shown in FIG. 1 as viewed from an A direction.

The optical unit 10 includes a light source 12 configured to emit visible light to illuminate surroundings, a laser unit 13 which is an electromagnetic wave generator configured to emit electromagnetic waves to detect a surrounding object, a first reflector 14 configured to reflect emitted light L emitted from the light source 12 and a laser L' emitted by the laser unit 13 in a first reflection region R1 whose reflection direction is changed periodically, and a second reflector 16 configured to reflect first reflected light L1 reflected by the first reflector 14 and a first laser L'1 which is first electromagnetic waves again in a second reflection region R2 whose reflection direction is changed periodically.

The first reflector 14 is configured to scan the second reflection region R2 with the first reflected light L1 and the first laser L'. The second reflector 16 is configured to form a high beam light distribution pattern PH by performing scanning with second reflected light L2 obtained by reflecting the first reflected light L1, and to detect a surrounding object by performing scanning with a second laser L'2 obtained by reflecting the first laser L'.

The light source 12 is not particularly limited as long as the light source 12 is suitable for illumination and light distribution of a lamp. However, a semiconductor light emitting element which is an LED element, a laser diode (LD) element, an EL element, or the like is preferable from a viewpoint of miniaturization. The number of light emitting elements provided in the light source 12 may be one or more.

The laser unit 13 is a so-called light detection and ranging (LiDAR). The laser unit 13 may emit electromagnetic waves having relatively short wavelengths, such as ultraviolet rays, visible rays, and near infrared rays. In this case, since the laser unit 13 can accurately grasp a situation (presence or absence and a position of a pedestrian or other vehicles, a road shape, a position of a building, and the like) around the vehicle, appropriate light distribution control can be performed according to the situation around the vehicle. As an electromagnetic wave generator other than the laser unit 13, a millimeter wave radar, a microwave radar, or the like may be used.

Figure 3A:
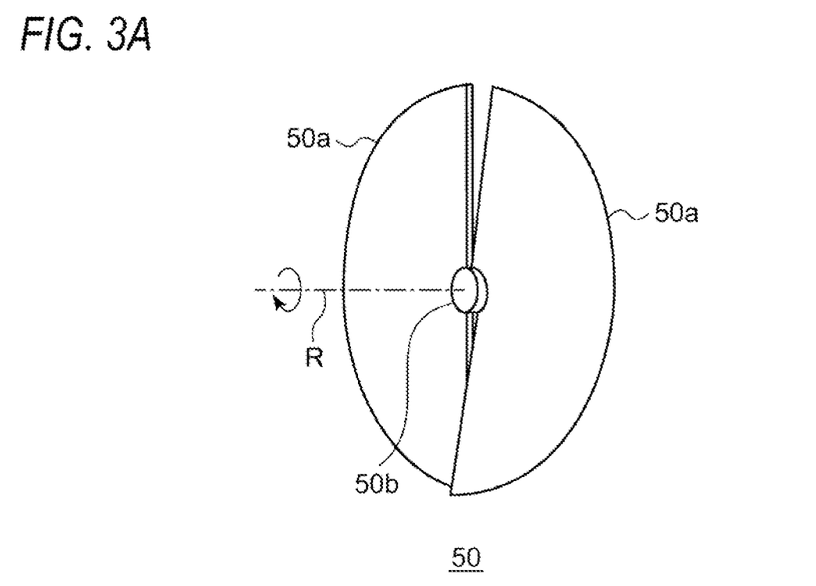
FIG. 3A is a perspective view showing an example of a rotary reflector that can be used as a first reflector.
Figure 3B:
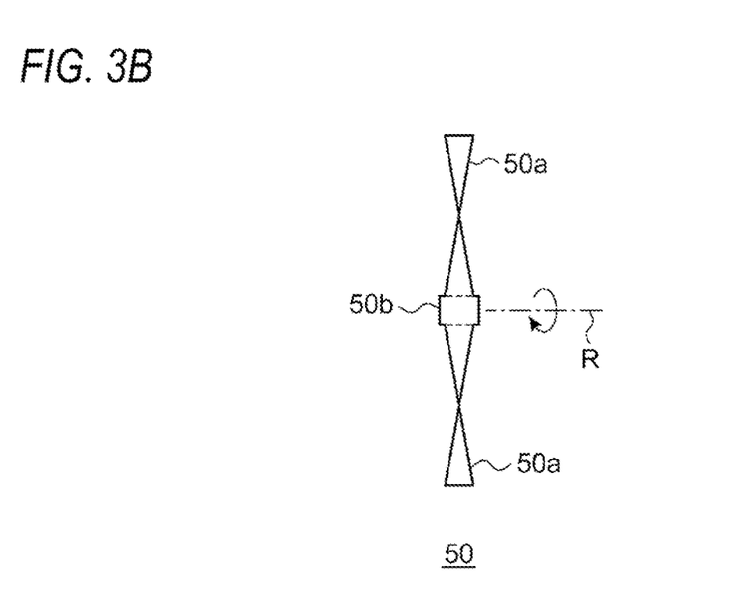
FIG. 3B is a side view of the rotary reflector shown in FIG. 3A.

Next, shapes of the first reflector 14 and the second reflector 16 will be described. FIG. 3A is a perspective view showing an example of a rotary reflector that can be used as the first reflector 14. FIG. 3B is a side view of the rotary reflector shown in FIG. 3A.

A rotary reflector 50 shown in FIGS. 3A and 33 is rotated in one direction about a rotation axis R by a drive source which is a motor (not shown) or the like. The rotary reflector 50 is configured to form a desired light distribution pattern 50 by reflecting light emitted from an LED provided in the light source 12 while rotating. Further, the rotary reflector 50 also includes a reflective surface configured to reflect a laser emitted by the laser unit 13 while rotating, and to detect an object by scanning surroundings.

The rotary reflector 50 includes two blades 50a that have the same shape and function as the reflective surfaces (the first reflection region R1 and the second reflection region R2) around a tubular rotation portion 50b. The blade 50a has a twisted shape such that an angle formed by the rotation axis R and the reflective surface changes as the blade 50a moves in a circumferential direction about the rotation axis R. Accordingly, the first reflector 14 and the second reflector 16 can perform scanning using the first reflected light L1 and the second reflected light L2 as shown in FIG. 1.

Figure 4A:
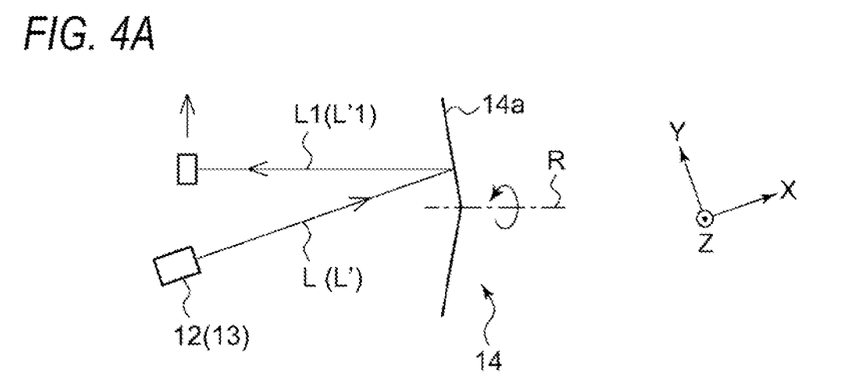
FIG. 4A schematically shows a state in which scanning is performed with a first reflected light L1 and a first laser L'1 when the rotary reflector is used as the first reflector.
Figure 4B:
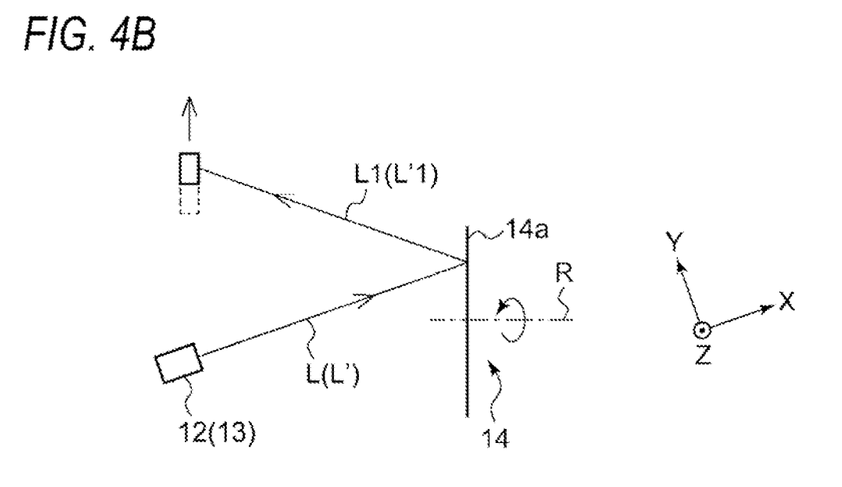
FIG. 4B schematically shows a state in which scanning is performed with the first reflected light L1 and the first laser L'1 when the rotary reflector is used as the first reflector.
Figure 4C:
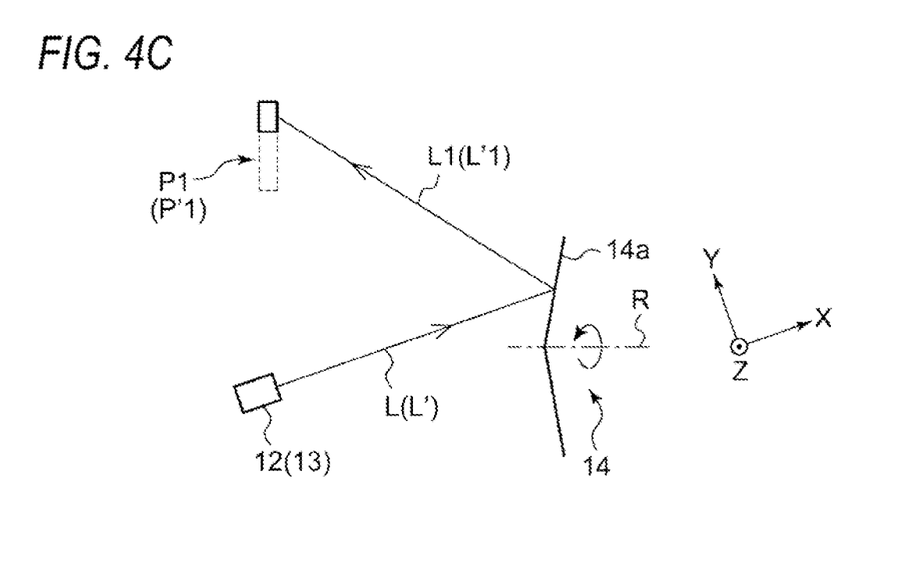
FIG. 4C schematically shows a state in winch scanning is performed with the first reflected light L1 and the first laser L'1 when the rotary reflector is used as the first reflector.

FIGS. 4A to 4C schematically show a state in which scanning is performed with the first reflected light L1 and the first laser L'1 when the rotary reflector 50 is used as the first reflector 14. As shown in FIGS. 4A to 4C, when a blade 14a (corresponding to the blade 50a of the rotary reflector 50) of the first reflector 14 rotates, a reflective surface gradually changes relative to the rotation axis R. As a result, the second reflection region R2 is scanned with the first reflected light L1 to form a line-shaped pattern P1. Similarly, scanning is performed with the first laser L'1 over the second reflection region R2 to form a line-shaped pattern P'1.

Figure 5A:
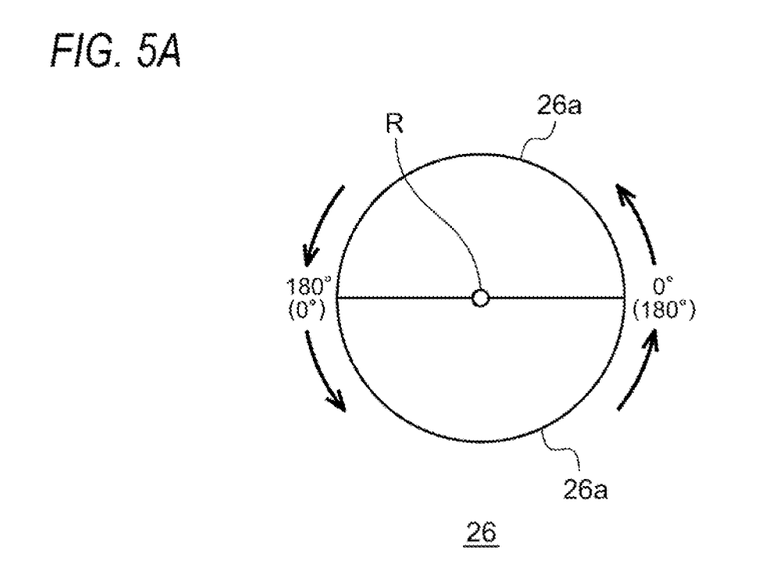
FIG. 5A is a schematic diagram showing a shape of a rotary reflector that can be used as a second reflector.
Figure 5B:
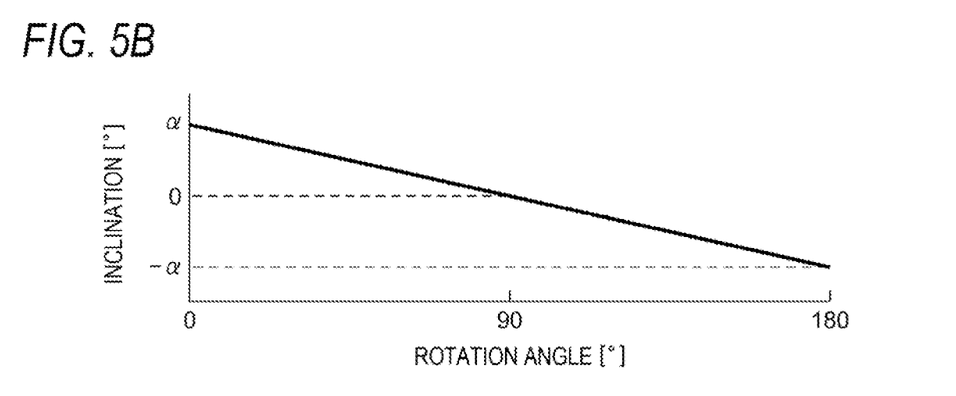
FIG. 5B shows a specific shape of the rotary reflector.
Figure 6A:
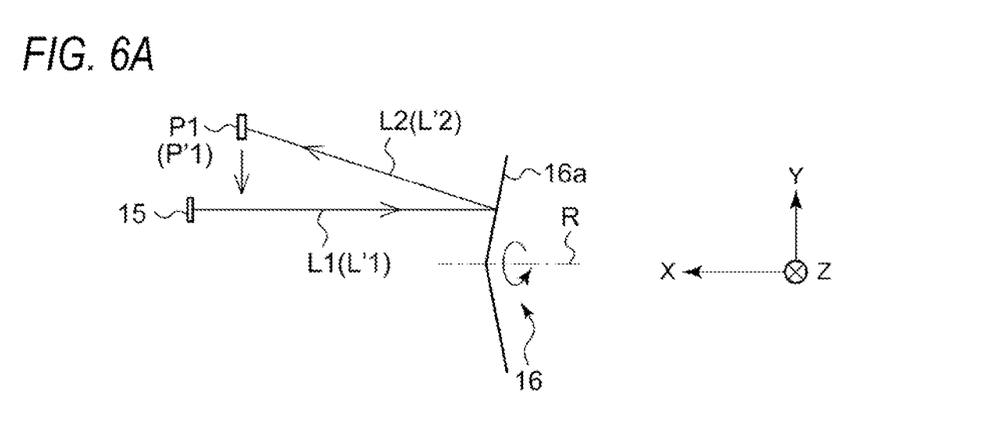
FIG. 6A schematically shows a state in which scanning is performed with a second reflected fight L2 and a second laser L'2 when the rotary reflector is used as the second reflector.
Figure 6B:
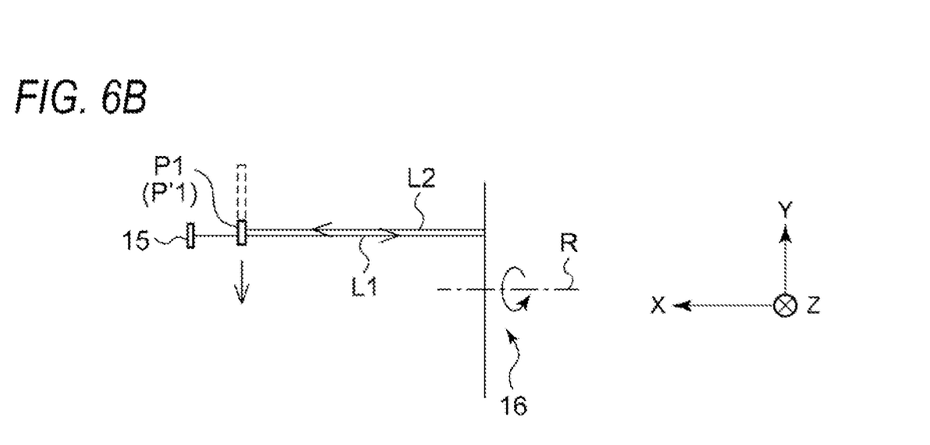
FIG. 6B schematically shows a state in which scanning is performed with the second reflected light L2 and the second laser L'2 when the rotary reflector is used as the second reflector.
Figure 6C:
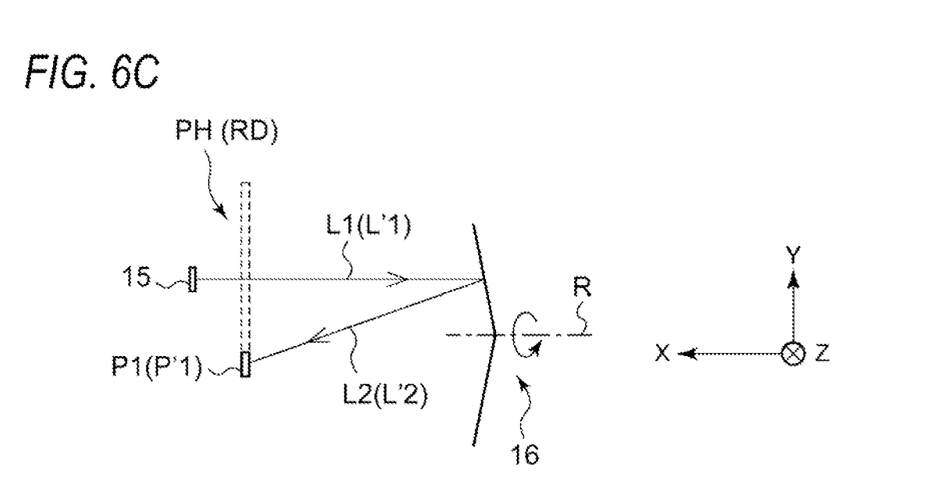
FIG. 6C schematically shows a state in winch scanning is performed with the second reflected light L2 and the second laser L'2 when the rotary reflector is used as the second reflector.

FIG. 5A is a schematic diagram showing a shape of a rotary reflector 26 that can be used as the second reflector 16. FIG. 5B shows a specific shape of the rotary reflector 26. FIGS. 6A to 6C schematically show a state in which scanning is performed with the second reflected light L2 and the second laser L'2 when the rotary reflector 50 is used as the second reflector 16.

In the rotary reflector 26, when a boundary between two blades 26a is set to a rotation angle of 0°, an angle formed by a normal of a reflective surface at that position and a rotation axis R is α° (see FIG. 5B), and a right end of the high beam light distribution pattern in FIG. 2 is irradiated with the pattern P1. The rotary reflector 26 is formed such that, when the rotation angle is 90°, an angle formed by the normal of the reflective surface at that position and the rotation axis R is 0° (see FIG. 5B), and a center of the high beam light distribution pattern PH in FIG. 2 is irradiated with the pattern P1. The rotary reflector 26 is formed such that, when the rotation angle is 180°, an angle formed by the normal of the reflective surface at that position and the rotation axis R is −α° (see FIG. 5B), and a left end of the high beam light distribution pattern PH in FIG. 2 is irradiated with the pattern P1.

Then, as shown in FIGS. 6A to 6C, when a blade 16a (corresponding to the blade 26a of the rotary reflector 26) of the second reflector 16 rotates, the reflective surface gradually changes with respect to the rotation axis R. As a result, scanning is performed in a left-right direction in front of a vehicle with the line-shaped pattern P1 formed by performing scanning with a light source image 15, which is the first reflected light L1, on the second reflection region R2. Similarly, scanning is performed in a left-right direction in front of the vehicle with the line-shaped pattern P'1 formed by performing scanning with the laser L' emitted by the laser unit 13, which is the reflected first laser L'1, on the second reflection region R2.

In the optical unit 10 as described above, the emitted light L of the light source 12 is reflected in the first reflection region R1 whose reflection direction is changed periodically, and the second reflection region R2 is scanned in at least a line with the first reflected light L1 that has been reflected. Then, the line-shaped pattern P1 is further reflected in the second reflection region R2 whose reflection direction is changed periodically, and a two-dimensional range is scanned with the second reflected light L2 that has been reflected. In this way, the high beam light distribution pattern PH is formed.

Similarly, in the optical unit 10, the laser L' emitted by the laser unit 13 is reflected in the first reflection region R1 whose reflection direction is changed periodically, and the second reflection region R2 is scanned in at least a line with the reflected first laser L'1. Then, the line-shaped pattern P'1 is further reflected in the second reflection region R2 whose reflection direction is changed periodically, and the two-dimensional range is scanned with the reflected second laser L'2, so that a surrounding object is detected. The optical unit 10 or the vehicle lamp including the optical unit 10 is provided with a detector configured to detect a laser reflected by a surrounding object.

Figure 7:
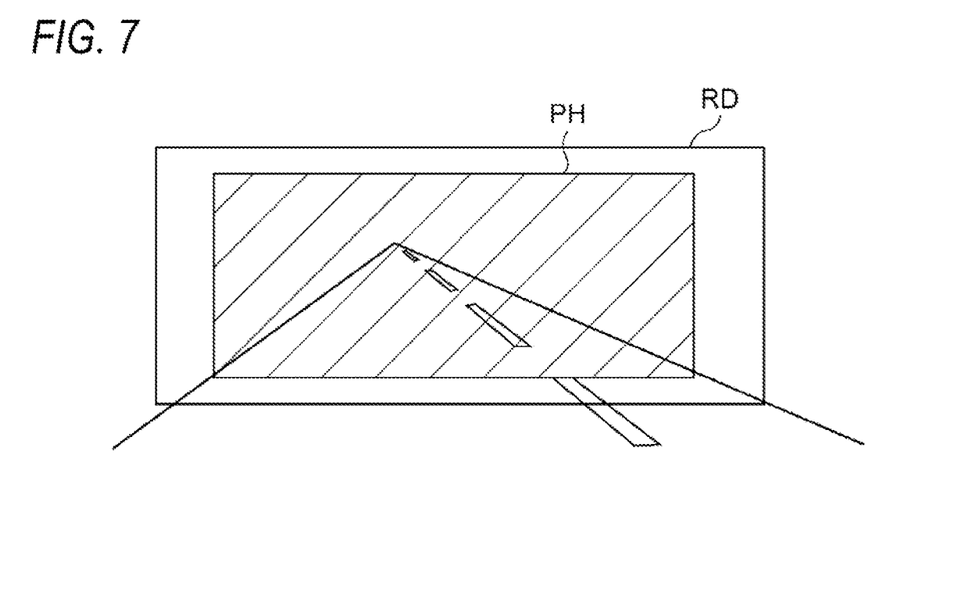
FIG. 7 schematically shows an irradiation range of a high beam light distribution pattern and an irradiation range of a laser emitted by a laser unit according to the present embodiment.

FIG. 7 schematically shows an irradiation range of a high beam light distribution pattern and an irradiation range of a laser emitted by a laser unit according to the present embodiment. As shown in FIG. 7, a distant region or an oncoming lane region in front of a host vehicle is irradiated with the high beam light distribution pattern PH.

In the optical unit 10 as described above, the emitted light L of the light source 12 is reflected in the first reflection region R1 whose reflection direction is changed periodically, and the second reflection region R2 is scanned in at least a line with the first reflected light L1 that has been reflected. Then, the line-shaped pattern P1 is further reflected in the second reflection region R2 whose reflection direction is changed periodically, and the two-dimensional range is scanned with the second reflected light L2 that has been reflected, so that a light distribution pattern is formed. Therefore, even the light source 12 includes only one light emitting element, it is possible to form a non-irradiation region at a predetermined position of the light distribution pattern by controlling turning on and off of the light emitting element, so that more light distribution patterns can be formed.

The optical unit 10 can irradiate a wider range than a range that the light source can directly irradiate without using a reflector. According to the optical unit 10, the laser L' emitted by the laser unit 13 is reflected in the first reflection region R1 whose reflection direction is changed periodically, and the second reflection region. R2 is scanned in at least a line with the reflected first laser L'1. Then, the line-shaped pattern P'1 is further reflected in the second reflection region R2 whose reflection direction is changed periodically, and the two-dimensional range is scanned with the reflected second laser L'2. Accordingly, the optical unit 10 can detect (irradiate) an object in a wider range without using a reflector or using only one reflector as compared to a range in which the laser unit 13 can detect (irradiate) an object with a laser. In other words, a size of the laser unit 13 can be reduced.

As shown in FIG. 1, a vehicular headlamp 100 according to the present embodiment includes the above-described optical unit 10 and a control unit 28 configured to control magnitude of a drive current of the light source 12 and the laser unit 13 according to a light distribution pattern. In a traveling vehicle, it is particularly important to detect an object on a road or a sidewalk. Therefore, it is preferable that a region below visible light for illuminating the surroundings can be irradiated with electromagnetic waves for detecting a surrounding object. Therefore, it is preferable that a wider region than that illuminated with the visible light for illuminating the surroundings can be irradiated with the electromagnetic waves for detecting a surrounding object.

Therefore, the laser unit 13 is provided with respect to the first reflector 14 such that a detection region RD (see FIG. 7) can be irradiated with a laser. The detection region RD includes a region below the high beam light distribution pattern PH, that is, a closer region in front of a vehicle, and is wider than the high beam light distribution pattern PH. Specifically, as shown in FIG. 1, the laser unit 13 is provided below the light source 12. In the laser unit 13, a direction of the laser L' emitted by the laser unit 13 is determined such that the emitted light L emitted from the light source 12 is reflected outside a position where the emitted light L is reflected by the blade 14a of the first reflector 14.

Here, an irradiation range of the high beam light distribution pattern is, in a range irradiated with light of the light source, a range having a maximum luminous intensity and a range having a luminous intensity of 30% or more of the maximum luminous intensity continuous with the range having the maximum luminous intensity.

The second reflection region R2 of the second reflector 16 is preferably wider than the first reflection region R1 of the first reflector 14 so as to reflect the line-shaped pattern P1 (P'1) formed by performing scanning with the rectangular or circular light source image 15 or the first laser L"1. That is, a radius of the one blade 16a of the second reflector 16 is preferably larger than a radius of the one blade 14a of the first reflector 14.

In the optical unit 10 according to the present embodiment, it is necessary to scan the second reflection region R2 on the second reflector 16 a plurality of times with the light source image 15 while the region corresponding to the high beam light distribution pattern PH is scanned once with the pattern P1. Similarly, it is necessary to scan the second reflection region R2 a plurality of times with the first laser L'1 while the detection region RD is scanned once with the pattern P'1. Therefore, in the optical unit 10 according to the present embodiment, rotation frequency of the first reflector 14 when the high beam light distribution pattern PH and a pattern for irradiating the detection region RD are formed is larger than rotation frequency of the second reflector 16. Accordingly, during one rotation of the second reflector 16, the second reflection region R2 can be scanned at least once by the visible light or the electromagnetic waves reflected by the first reflector 14. Therefore, sizes of a light emitting unit of the light source 12 and a generation unit of the laser unit 13 can be reduced.

The rotation frequency of the first reflector 14 and the rotation frequency of the second reflector 16 may both be 50 Hz or more. Accordingly, flickering of the light distribution pattern formed by visible light is prevented.

The rotation frequency of the first reflector 14 may be different from the rotation frequency of the second reflector 16. Accordingly, a situation is prevented in which only a part of the desired light distribution pattern is repeatedly scanned with the second reflected light.

Second Embodiment

In the first embodiment, a case has been described in which the rotary reflector 50 shown in FIGS. 3A and 3B is used as the first reflector 14. However, as long as the line-shaped pattern P1 (P'1) can be formed on the second reflection region R2 of the second reflector 16, the first reflector may have another configuration. For example, a micro electro mechanical systems (MEMS) mirror can also be used as the first reflector.

Figure 8A:
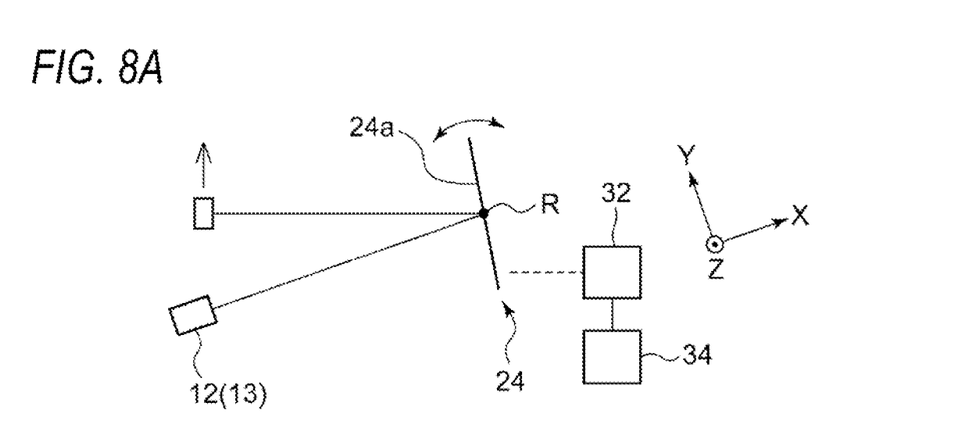
FIG. 8A schematically shows a state in which scanning is performed with the first reflected light L1 when a MEMS mirror is used as the first reflector.
Figure 8B:
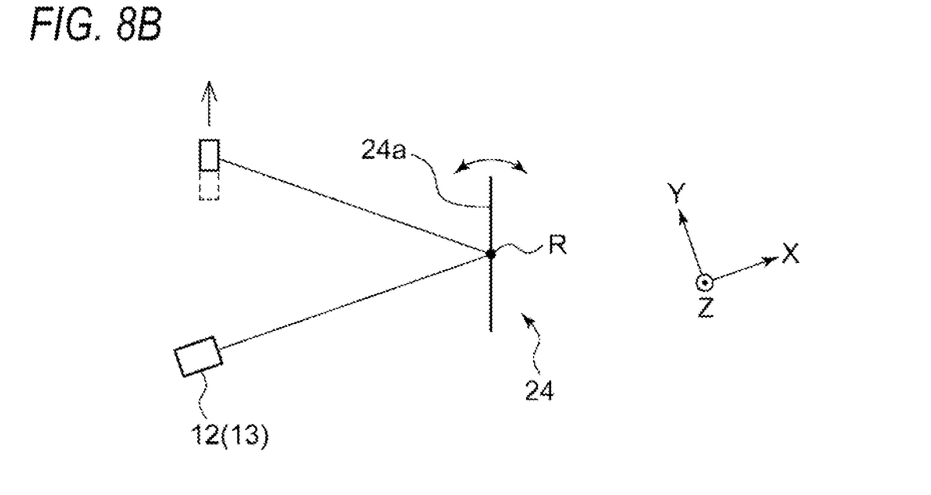
FIG. 8B schematically shows a state in which scanning is performed with the first reflected light L1 when the MEMS mirror is used as the first reflector.
Figure 8C:
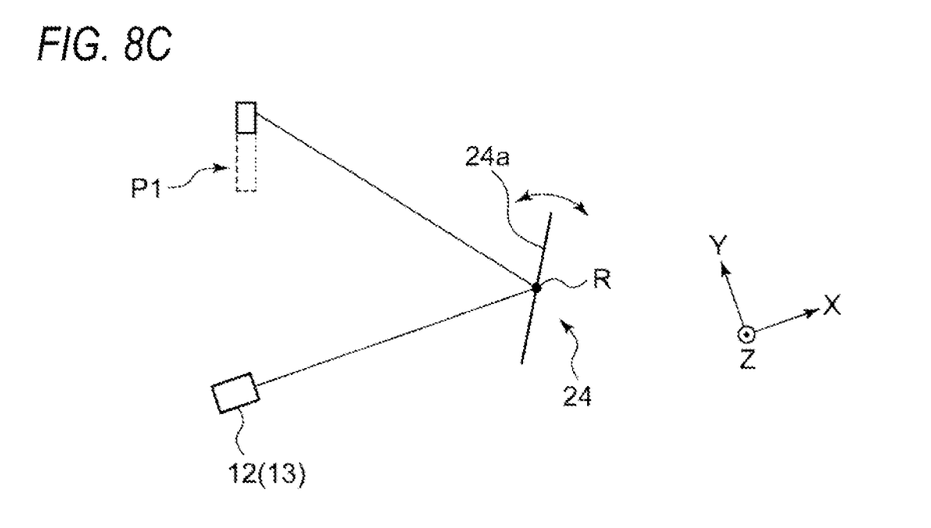
FIG. 8C schematically shows a state in which scanning is performed with the first reflected light L1 when the MEMS mirror is used as the first reflector.

FIGS. 8A to 8C schematically show a state in which scanning is performed with the first reflected light L1 when the MEMS mirror is used as the first reflector. As shown in FIGS. 8A to 8C, When a reflective surface 24a of the first reflector 24 rotates with the Z direction as the rotation axis R, the reflection surface 24a changes gradually with respect to the rotation axis R. As a result, the second reflection region R2 is scanned with the first reflected light L1 to form the line-shaped pattern P1. Subsequent operation is the same as that according to the first embodiment, and a description thereof will be omitted.

In this way, when the MEMS mirror is used as the first reflector 24, a size can be reduced as compared with that of the rotary reflector 50 shown in FIGS. 3A and 3B. The first reflector 24 can be driven at relatively high frequency, and can not only resonate with a constant amplitude but also temporarily change the amplitude. Therefore, the first reflector 24 can perform more diverse controls in formation of the light distribution pattern, Therefore, a vehicular headlamp according to the second embodiment includes an optical unit including the first reflector 24 using the MEMS mirror instead of the first reflector 14 in the optical unit 10 according to the first embodiment. The vehicular headlamp according to the second embodiment further includes a control unit 32 configured to control an amplitude of the MEMS mirror based on a traveling state (for example, a vehicle speed) of a vehicle, and a sensor 34 configured to detect the vehicle speed and a steering angle of the vehicle. The sensor 34 is, for example, a vehicle speed sensor, an acceleration sensor, a steering angle sensor, or the like.

The vehicular headlamp according to the second embodiment can focus the visible light emitted by the light source 12 or the laser emitted by the laser unit 13 by, for example, reducing an amplitude of a reflection element by the control unit when a vehicle is traveling at high speed and requires visible light irradiation or object detection at a greater distance. In other words, the visible light or the laser can be emitted to a great distance.

Third Embodiment

In the embodiments described above, a case has been described in which the light source includes one light emitting element. However, the light source may need to include a plurality of light emitting elements, or a plurality of light sources may need to be provided. For example, output of one light emitting element is insufficient, an irradiation range is desired to be widened, or a drive frequency (a rotation speed) of each reflector is insufficient When the output of one light emitting element is not sufficient, if the drive frequency (the rotational speed) of each reflector remains unchanged, the high beam light distribution pattern becomes dark as a whole. On the other hand, if the drive frequency (the rotational speed) of each reflector is low, a gap that is not scanned with the light source image is generated in a pan of the irradiation range.

Therefore, the light source according to the present embodiment includes a plurality of light emitting elements. For example, the light source includes light emitting elements arranged in a matrix of m×n (both m and n are natural numbers, and m≠1 or n≠1). Accordingly, for example, it is possible to form an upper half region of the high beam light distribution pattern by emitted light emitted from a first light emitting element, and to form a lower half region of the high beam light distribution pattern by emitted light emitted from the second light emitting element. As a result, when output of one light emitting element is insufficient or when an irradiation range is desired to be widened, a light distribution pattern having desired characteristics can be formed.

Figure 9:
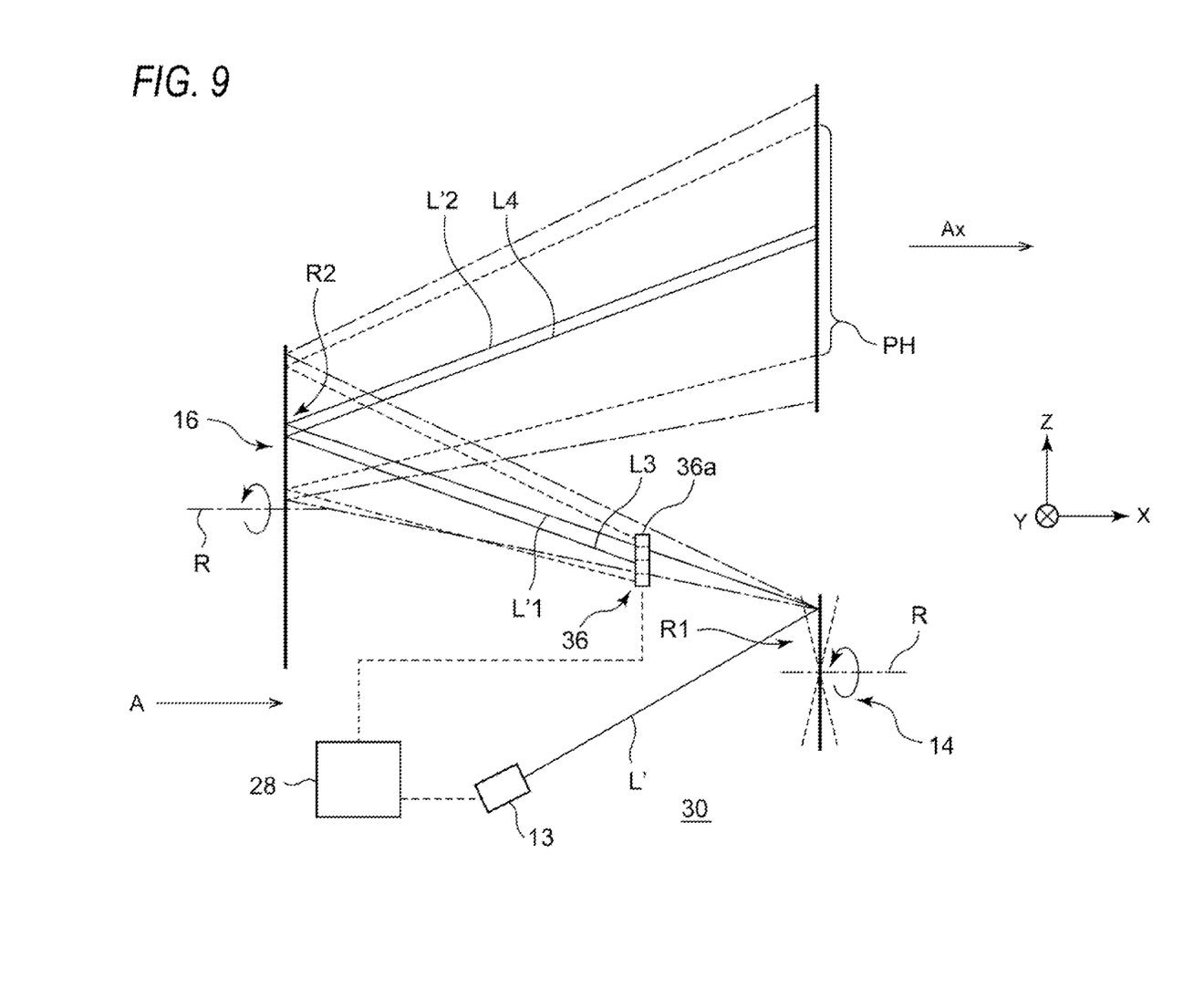
FIG. 9 is a top view showing a schematic configuration of an optical unit according to a third embodiment.

FIG. 9 is a top view showing a schematic configuration of an optical unit according to a third embodiment. Main features of an optical unit 30 according to the third embodiment are that the optical unit 30 includes a light source 36 in which a plurality of light emitting elements 36a are arranged in an array or a matrix, and that only the laser L' is reflected by the first reflector.

That is, the optical unit 30 according to the third embodiment includes the light source 36 in which the plurality of light emitting elements 36a are arranged in an array or a matrix and which is configured to emit, visible light to illuminate surroundings, the laser unit 13 configured to detect a surrounding object, the first reflector 14 configured to reflect a laser L' emitted by the laser unit 13 in the first reflection region R1 whose reflection direction is changed periodically, and the second reflector 16 configured to reflect emitted light L3 emitted from the light source 36 and the first laser L'1 reflected by the first reflector 14 in the second reflection region R2 whose reflection direction is changed periodically.

The first reflector 14 may have a reflective surface to scan the second reflection region R2 with the first laser L'. That is, in the first embodiment, a configuration of the first reflector 14 can be set so as to scan the second reflection region R2 with the first laser L'1 without considering reflection of the visible light emitted by the light source. Therefore, it is possible to increase a degree of freedom in design (for example, a shape and a side of a reflective surface and a rotation speed), to reduce a size of the first reflector 14, and to realize simplification of the first reflector 14.

The second reflector 16 has the second reflection region R2 so as to form the light distribution pattern PH by performing scanning with reflected light L4 obtained by reflecting the emitted light L3, and to detect a surrounding object by performing scanning with the second laser L'2 obtained by reflecting the first laser L'. The rotation frequency of the second reflector 16 may be 50 Hz or more.

Accordingly, flickering of the light distribution pattern formed by the visible light is prevented.

In the optical unit 30 according to the third embodiment, the array-shaped or matrix-shaped emitted light L3 emitted from the light source 36 is reflected in the second reflection region R2 whose reflection direction is changed periodically, the two-dimensional range is scanned with the reflected light L4, and the light distribution pattern PH is formed.

In the optical unit 30, the laser L' emitted by the laser unit 13 is reflected in the first reflection region R1 whose reflection direction is changed periodically, and the second reflection region R2 is scanned in at least a line with the reflected first laser L'1. Then, the line-shaped pattern is further reflected in the second reflection region R2 whose reflection direction is changed periodically, and the two-dimensional range is scanned with the reflected second laser L'2. Accordingly, when no reflector is used or when only one reflector is used, the optical unit 30 can detect (irradiate) an object in a wider range as compared to a range in which the laser unit 13 can detect (irradiate) an object with a laser. In other words, the size of the laser unit 13 can be reduced.

Modification Optical Unit

In the optical unit according to the embodiments described above, the second reflector performs scanning with a vertically long pattern in a horizontal direction, so that the high beam light distribution pattern PH and the detection region RD are formed. The vertically long pattern is formed by performing scanning in a vertical direction with the first reflector. However, in the optical unit according to the modification, the second reflector performs scanning with a horizontally long pattern in the vertical direction, so that the high beam light distribution pattern PH and the detection region RD can be formed. The horizontally long pattern is formed by performing scanning in the horizontal direction with the first reflector. The optical unit according to the modification also has the same effects as the optical unit 10 according to the first embodiment.

Reflective Surface of Reflector

In the optical unit according to the embodiments described above, in the first reflector and the second reflector, not only visible light for illuminating the surroundings but also electromagnetic waves for detecting a surrounding object are reflected. Further, a light source configured to emit visible light and an electromagnetic wave generator configured to emit electromagnetic waves (for example, laser light having a wavelength of invisible light) need to be provided at different positions so as not to interfere with each other. Therefor, a region and a direction of reflection of visible light and electromagnetic waves by each reflector do not necessarily match.

Figure 10:
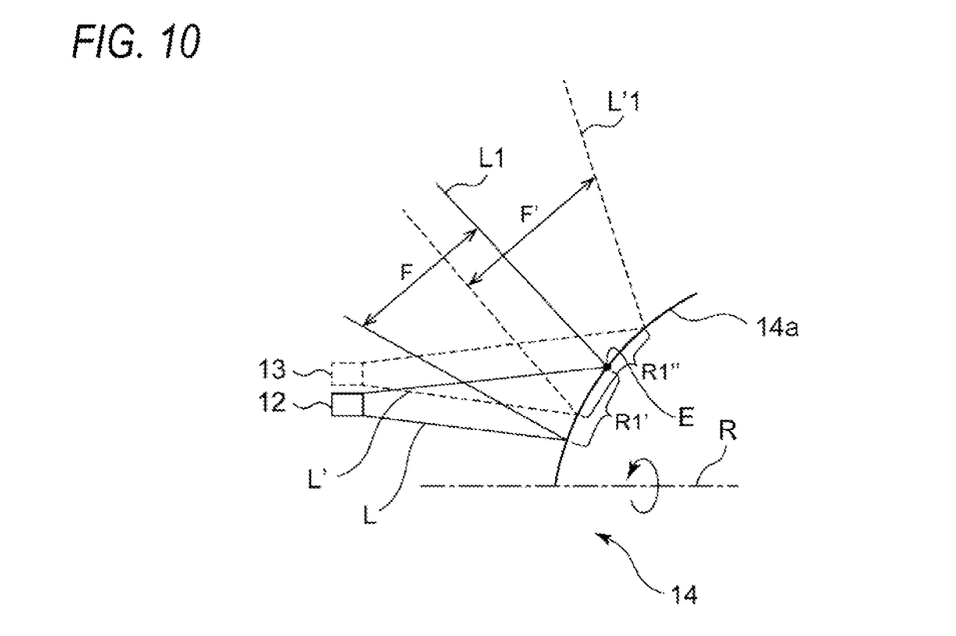
FIG. 10 is a schematic diagram showing a shape of a blade of the first reflector according to a modification.

FIG. 10 is a schematic diagram showing a shape of the blade 14a of the first reflector 14 according to the modification. As shown in FIG. 10, in the blade 14a, a visible light reflection region R1' that reflects the emitted light L from the light source 12 and a laser reflection region R1" that reflects the laser L' emitted by the laser unit 13 are misaligned. The laser reflection region R1" partially overlaps with the visible light reflection region R1'. However, a part of the laser reflection region R1" is located at an outer side of the blade 14a with respect to the visible light reflection region R1'. Therefore, the laser reflection region R1" outside a boundary portion E of the visible light reflection region R1' can be formed into a blade shape in consideration of only the reflection of the laser L'.

Therefore, for example, it is easy to design a shape of the blade 14a such that an irradiation range F' of the first laser L'1 obtained by reflecting the laser L' in the laser reflection region R1" is wider than an irradiation range F of the first reflected light L1 obtained by reflecting the visible light (the emitted light L) in the visible light reflection region R1'. Arrangements and emission directions of the light source 12 and the laser unit 13 are devised such that the visible light reflection region R1' and the laser reflection region R1" hardly overlap each other. Accordingly, shapes of the reflective surfaces of the visible light reflection region R1' and the laser reflection region R1" can be individually optimized.

The technical idea of determining the shape of the blade 14a shown in FIG. 10 described above can also be applied when a shape of the blade 16a of the second reflector 16 is determined, That is, in the second reflection region R2 of the blade 16a, a region that reflects the first reflected light L1 reflected by the first reflector 14 and a region that reflects the first laser L'1 also reflected by the first reflector 14 are not overlapped. Accordingly, it is possible to individually set an irradiation range that is irradiated with the second reflected light L2 reflected by the blade 16a and an irradiation range that is irradiated with the second laser L'2.

The present disclosure has been described above with reference to the embodiments described above. However, the present disclosure is not limited to the embodiments described above, and also includes those in which the configurations of the embodiments are appropriately combined or replaced. It is also possible to appropriately rearrange the combinations and the order of processing in the embodiments based on the knowledge of those skilled in the art, and to add modifications such as various design changes to the embodiments. The embodiments to which those modifications are added can also be included within the scope of the present disclosure.

The present application appropriately incorporates, the contents disclosed in Japanese Patent Application (Japanese Patent Application No. 2018-114548) filed on Jun. 15, 2018.

The invention claimed is:

1. An optical unit comprising:
a light source configured to emit visible light to illuminate surroundings;
an electromagnetic wave generator configured to emit electromagnetic waves to detect a surrounding object;
a first reflector configured to reflect emitted light emitted from the light source and electromagnetic waves emitted by the electromagnetic wave generator in a first reflection region whose reflection direction is changed periodically; and
a second reflector configured to reflect first reflected light and first electromagnetic waves that are reflected by the first reflector again in a second reflection region whose reflection direction is changed periodically,
wherein the first reflector is configured to scan the second reflection region with the first reflected light and the first electromagnetic waves,
wherein the second reflector is configured to form a light distribution pattern by performing scanning with second reflected light obtained by reflecting the first reflected light, and to detect a surrounding object by performing scanning with second electromagnetic waves obtained by reflecting the first electromagnetic waves, and wherein the second reflection region is wider than the first reflection region.

2. The optical unit according to claim 1,
wherein the second reflector reflects the first reflected light in the second reflection region while rotating in one direction about a rotation axis.

3. The optical unit according to claim 2,
wherein the second reflector is provided with one or more blades that function as the second reflection region around a rotation axis.

4. The optical unit according to claim 1,
wherein rotation frequency of the first reflector and rotation frequency of the second reflector are both 50 Hz or more.

5. The optical unit according to claim 1,
wherein the first reflector is a micro electro mechanical system.

6. A vehicular headlamp comprising:
the optical unit according to claim 5; and
a control unit configured to control an amplitude of a reflection element of the micro electro mechanical system based on a traveling state of a vehicle.

7. The optical unit according to claim 1,
wherein the first reflector reflects the emitted light in the first reflection region while rotating in one direction about a rotation axis.

8. The optical unit according to claim 1,
wherein rotation frequency of the first reflector is different from rotation frequency of the second reflector.

9. The optical unit according to claim 1,
wherein rotation frequency of the first reflector is larger than rotation frequency of the second reflector.

10. A vehicular headlamp comprising:
the optical unit according to claim 1; and
a control unit configured to control magnitude of a drive current of the light source according to the light distribution pattern,
wherein the electromagnetic wave generator is provided with respect to the first reflector so as to irradiate a range including a region below a light distribution pattern formed in front of a vehicle with electromagnetic waves based on emitted light emitted from the light source.

11. An optical unit comprising:
a light source in which a plurality of light emitting elements are arranged in an array or a matrix, and which is configured to emit visible light to illuminate surroundings;
an electromagnetic wave generator configured to emit electromagnetic waves to detect a surrounding object;
a first reflector configured to reflect electromagnetic waves emitted by the electromagnetic wave generator in a first reflection region whose reflection direction is changed periodically; and
a second reflector configured to reflect emitted light emitted directly from the light source and first electromagnetic waves reflected by the first reflector in a second reflection region whose reflection direction is changed periodically,
wherein the first reflector is configured to scan the second reflection region with the first electromagnetic waves, and
wherein the second reflector is configured to form a light distribution pattern by performing scanning with reflected light obtained by reflecting the emitted light, and to detect a surrounding object by performing scanning with second electromagnetic waves obtained by reflecting the first electromagnetic waves.

12. The optical unit according to claim 11,
wherein rotation frequency of the second reflector is 50 Hz or more.

* * * * *